June 18, 1940.   R. N. DUNKLE   2,204,727
MACHINE FOR CUTTING LEATHER
Filed May 3, 1938   2 Sheets-Sheet 1

R. N. Dunkle INVENTOR.
BY *CA Snow & Co.*
ATTORNEYS.

R. N. Dunkle INVENTOR.

BY *Ch Snow & Co.*

ATTORNEYS.

Patented June 18, 1940

2,204,727

UNITED STATES PATENT OFFICE 2,204,727

MACHINE FOR CUTTING LEATHER

Ross N. Dunkle, Dry Run, Pa., assignor of one-half to Howell C. Epperly, Philadelphia, Pa.

Application May 3, 1938, Serial No. 205,854

1 Claim. (Cl. 164—37)

This invention relates to a machine designed for cutting leather stock in the formation of laces.

The primary object of the invention is to provide a machine of this character wherein the leather stock may be cut into exceptionally long lacings, to the end that the length of the lacings is not restricted to the length of the hide or stock being cut.

An important object of the invention is to provide a machine of this character which will insure the cutting of lacings having smooth edges, so that the lacings will have a finished appearance and may be used in the art of leather craft in making such articles as pocket books, key holders, or similar articles for pocket and personal use.

A further object of the invention is the provision of means for regulating the width of the lacing cut, to the end that a lacing of practically any desired width, within certain limitations, may be produced.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
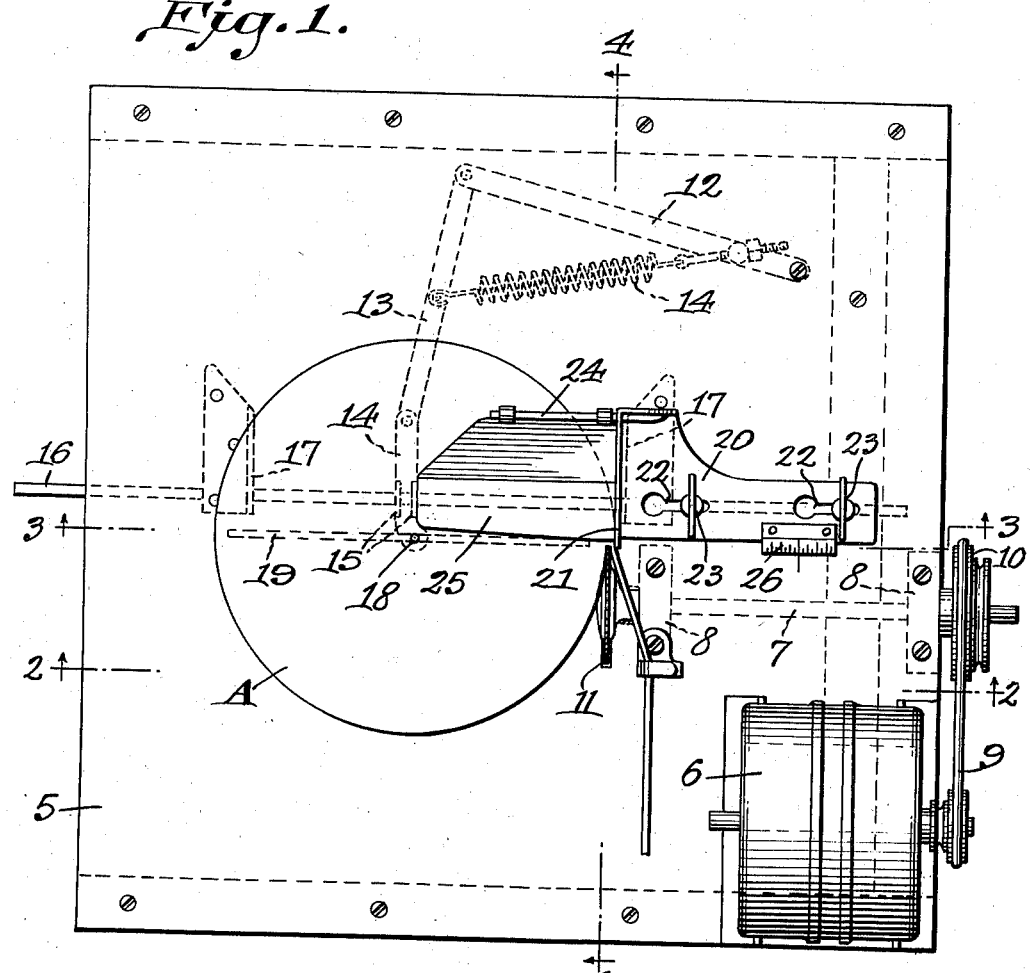
Figure 1 is a plan view of a leather cutting machine constructed in accordance with the invention.
Figure 2:
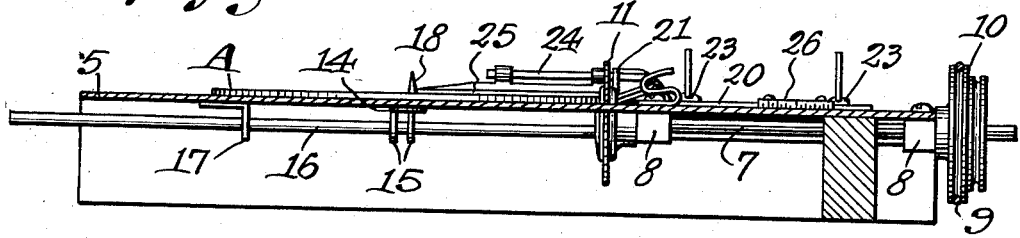
Figure 2 is a sectional view taken on line 2—2 of Figure 1.
Figure 3:
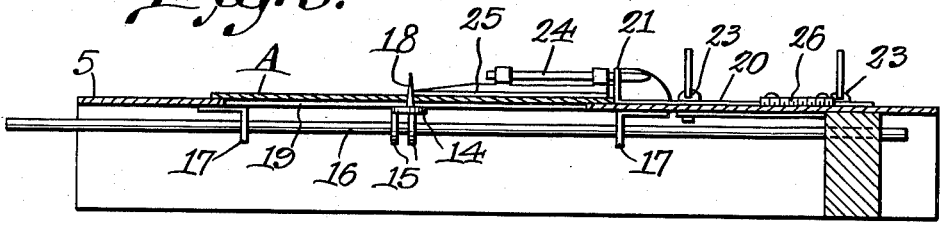
Figure 3 is a sectional view taken on line 3—3 of Figure 1.
Figure 4:
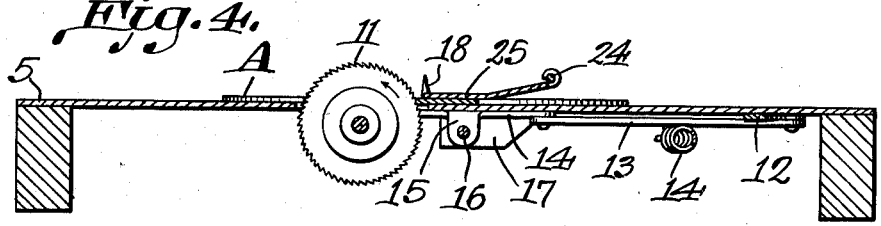
Figure 4 is a sectional view taken on line 4—4 of Figure 1.

Referring to the drawings in detail, the device includes a table 5 on which the motor 6 is mounted, the motor transmitting movement to the shaft 7 supported in bearings 8 mounted under the table 5, through the belt 9 and pulleys 10 mounted on shaft 7. The rotary knife blade indicated at 11 is supported on the inner end of the shaft 7 to move therewith, the knife blade 11 operating through a slot in the table 5, as shown by Figure 1 of the drawings. As shown, the blade 11 is formed with teeth disposed in a direction with the direction of rotation of the blade, insuring a clean cutting action to provide a lace with smooth sharp edges.

Supported under the table 5, and pivotally connected thereto, is an arm 12, to the free end of which is pivotally connected the arm 13 which is urged towards the arm 12, by means of the coiled spring 14 that is shown as having its ends connected to the arms 12 and 13. A substantially short arm 14 is pivotally connected to the outer end of the arm 13, and is provided with spaced ears 15, that are apertured to accommodate the shaft 16, supported in brackets 17 disposed under the table 5. Thus it will be seen that due to this construction, the arm 14 may move longitudinally of the shaft 16. Extending upwardly from the free end of the arm 14, is a pin 18 that moves in the elongated opening 19, formed in the table 5. This pin 18 provides a support for the leather stock being cut, which in the present showing is indicated by the reference character A, the leather stock being cut in the form of a disk. The reference character 20 designates a guide plate which is formed with an upstanding guide flange 21 providing a surface against which the edge of the leather stock engages, as the strip or lacing is being cut therefrom. Key-hole openings 22 are provided in the guard plate and accommodate the winged bolts 23 that extend into threaded openings formed in the table 5, whereby the guide plate may be adjusted with respect to the cutting blade 11, so that laces or strips of various widths may be cut from the stock.

Extending from the guard plate in horizontal spaced relation with the table 5, is a rod 24 on which the presser plate 25 is pivotally mounted, the presser plate resting on the leather disk or stock under operation, holding the leather stock in proper position for a true cutting of the lacing.

Figure 5:
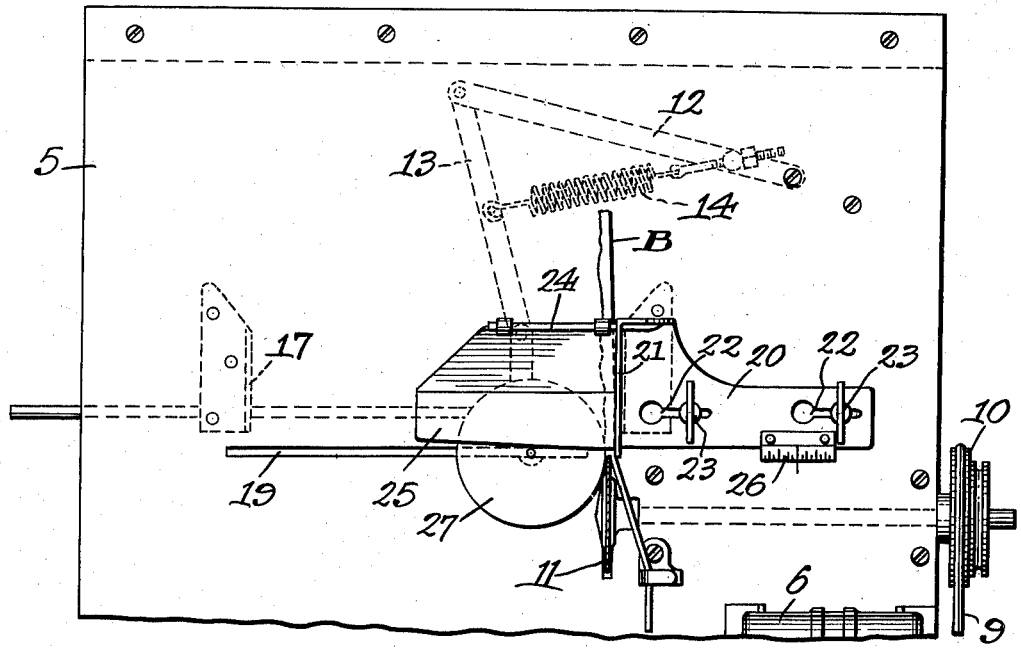
Figure 5 is a fragmental plan view showing the supporting arm as moved inwardly towards the rotary knife, and supporting a presser disk used in trimming the edge of a lacing.

In Figure 5 of the drawings, I have shown the use of the device as a means for trimming and straightening the rough edge of a lacing or strip, in which case, a presser disk 27 is positioned on the pin 18, and acts to hold the leather lacing or strip into engagement with the rotary knife blade, the leather lacing being trimmed, being indicated by the reference character B. A gauge indicated at 26 is provided on the guard plate, the graduations on the gauge cooperating with a line formed on the table, so that the adjustment of the guide plate may be carried out with facility.

When using the device the leather stock is cut in disk form and centered on the pin 18. The motor is now set in motion rotating the blade 11.

As the blade cuts the lace from the periphery of the disk, the lace cut is pulled by the operator drawing the lace from the blade and causing the disk of leather stock to rotate slowly, as it is being cut.

Due to this construction, a lace of exceptional length may be provided.

I claim:

A machine for cutting lacing strips from leather stock, comprising a table having an elongated opening formed therein, a pivoted arm mounted under the table, an arm pivotally connected to the free end of said pivoted arm, a coiled spring connecting said arms and adapted to urge the arms towards each other, an arm pivotally connected to the free end of the latter arm, a pin rising from the last mentioned arm and operating through the slot, said pin providing a support for the leather stock being cut, a rotary power operated cutting blade mounted on the table and adapted to cut a strip of leather from the stock as the stock is fed to the blade, and an adjustable stop adapted to regulate the width of the lacing strips being cut.

ROSS N. DUNKLE.